G. McD. JOHNS.
ATOMIZER.
APPLICATION FILED FEB. 20, 1919.

1,361,526.

Patented Dec. 7, 1920.
2 SHEETS—SHEET 1.

Inventor
George McD. Johns

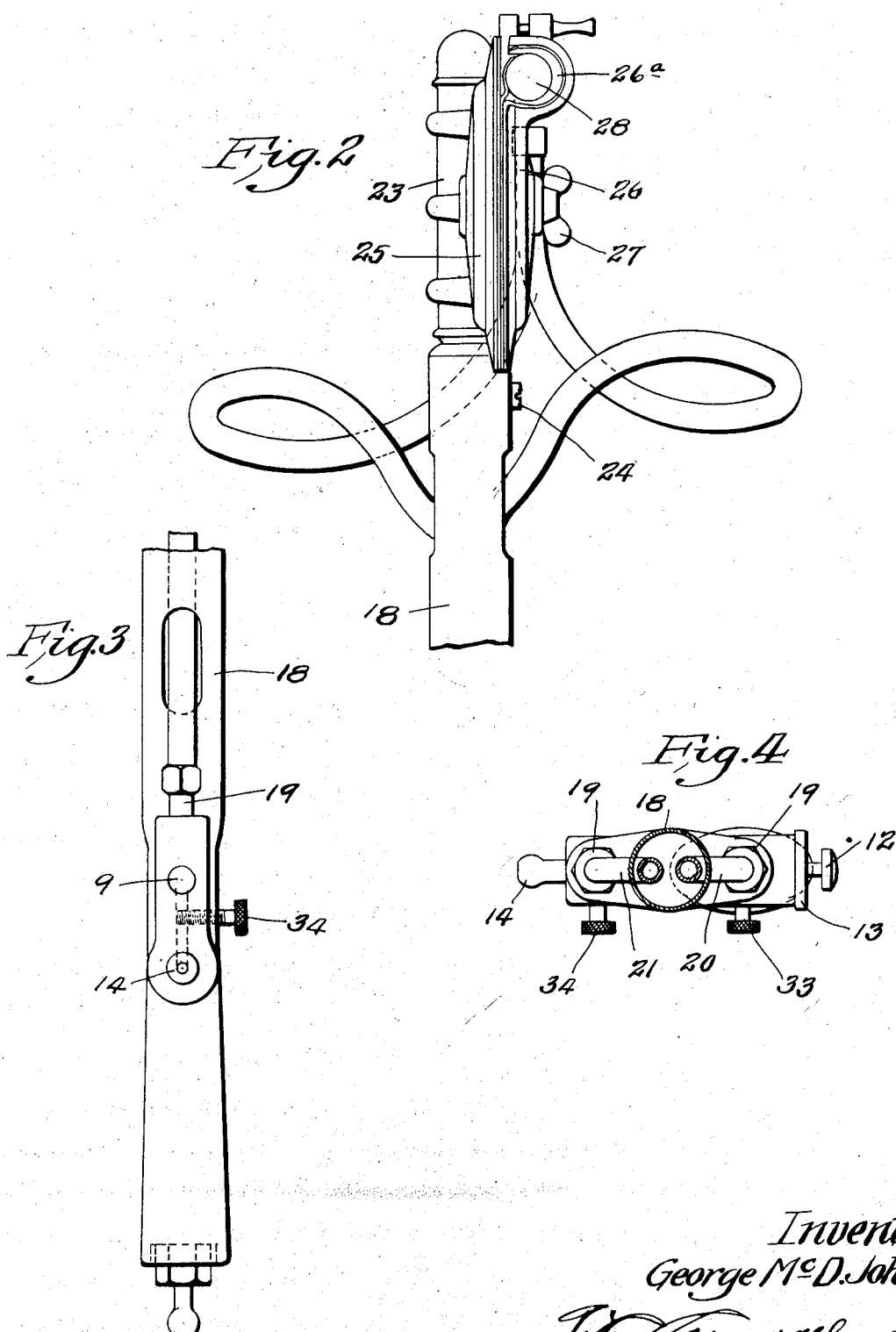

UNITED STATES PATENT OFFICE.

GEORGE McD. JOHNS, OF ST. LOUIS, MISSOURI, ASSIGNOR TO W. N. MATTHEWS AND BROTHER, INC., OF ST. LOUIS, MISSOURI, A CORPORATION OF NEW MEXICO.

ATOMIZER.

1,361,526.  Specification of Letters Patent.  Patented Dec. 7, 1920.

Application filed February 20, 1919. Serial No. 278,133.

*To all whom it may concern:*

Be it known that I, GEORGE McD. JOHNS, a citizen of the United States, residing at St. Louis, Missouri, have invented a certain new and useful Improvement in Atomizers, of which the following is a full, clear, and exact description, such as will enable others skilled in the art to which it appertains to make and use the same, reference being had to the accompanying drawings, forming part of this specification, in which—

Fig. 2 is an edge elevational view of the same.

Fig. 3 is an edge elevational view of the lower portion of my improved atomizer as seen from the opposite side. And, Fig. 4 is a top plan view of the parts shown in Fig. 3.

Figure 1:
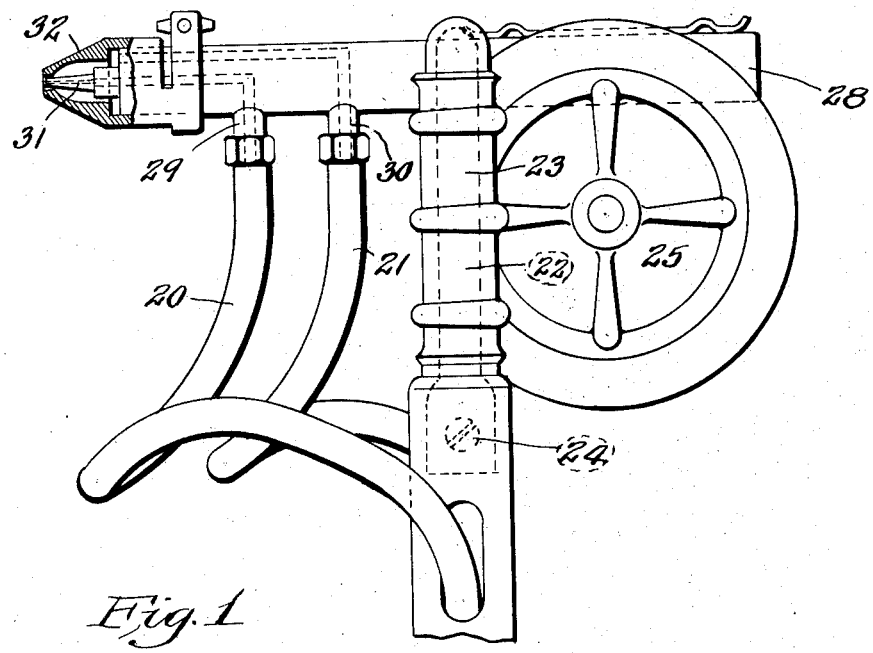
Figure 1 is a side elevational view foreshortened and partially in section of my improved atomizer.
Figure 1:
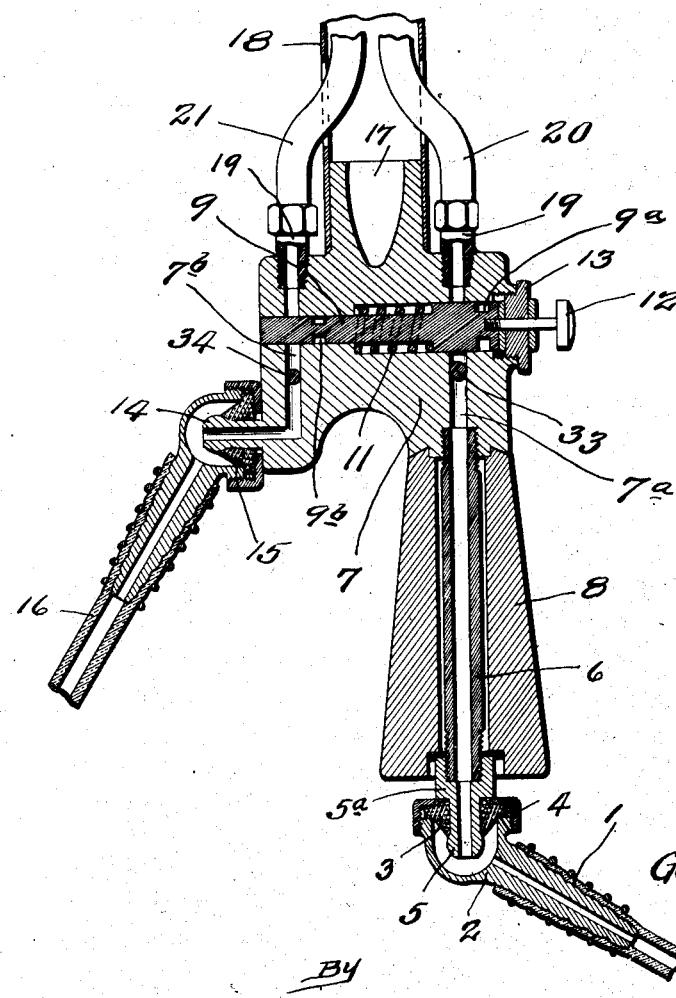

My invention relates to a new and useful improvement in atomizers or spray guns, as they are sometimes called, designed particularly for use in painting buildings, spraying trees, etc. The object of my present invention is to simplify the construction of atomizers of the character described whereby they may be cheaply manufactured, easily assembled and readily and efficiently manipulated.

In the drawings, 1 indicates a flexible tube leading from a source of compressed air supply and having secured in its end a nipple 2. This nipple has an angularly disposed threaded flange forming a seat for a rubber washer 3, said washer being held in place by means of a flanged cap 4.

5 indicates a nipple formed as an extension of a nut $5^a$, which nipple is designed to pass through the rubber washer 3 which forms an airtight joint therewith. 6 indicates a pipe onto which the nut 5 is threaded, said pipe forming a continuation of the air supply duct and being threaded into a casting 7. 8 indicates a handle of wood, said handle having a tooth or projection coöperating with a recess in the casting 7 whereby when the handle is in position it is prevented from rotation. The nut $5^a$ holds the handle in position on the pipe against the casting. The casting 7 is provided with a transversely disposed differential bore in which is arranged a longitudinally movable cylindrical valve 9, said valve being held outwardly in what might be designated as its closed position by means of a spring 11. The valve 9 is provided with reduced annuli $9^a$ and $9^b$ which are designed to register with and establish communication between the air ducts $7^a$ and the material supply ducts $7^b$ in the casting 7. A valve-operating button 12 is arranged upon the end of the valve and passes through a suitable packing nut 13. The material supply duct $7^b$ before referred to terminates in a nipple 14 which coöperates with a rubber washer 15 carried by the end of a material supply pipe 16. Pipes 1 and 16 are preferably flexible tubing, and each is provided with an angularly disposed connection for coöperation with their nipples, respectively, enabling the quick attachment and detachment of the pipes. 17 indicates a lug or boss extending upwardly with the casting 7 and providing means of attachment for a pipe or tube 18 forming an extension which carries the atomizing apparatus at its upper end. Nipples 19 are screwed into the casting to form connections between the air and material supply ducts therein and tubes 20 and 21, respectively, which tubes are preferably protected by a metallic sheathing or covering and enter the extension tube 18 through suitable openings therein so that said tubes 20 and 21 are practically housed within the extension tube or pipe throughout its length.

22 indicates a trunnion casting mounted in the upper end of tube 18 and on which is arranged a sleeve 23 capable of rotating, the casting being held in position by means of a set screw 24. 25 indicates one member of a friction support, the other member 26 of which is rotatably mounted thereon and frictionally held in adjusted positions by means of a butterfly or plain nut 27, which nut is adjusted to desired impinging position. The upper end of friction member 26 is provided with a seat $26^a$ in which is received and held the shank 28 of the atomizer barrel. This atomizer barrel is provided with two nipples 29 and 30 to which the air and material supply tubes 20 and 21 are connected, respectively. The atomizer barrel is provided with suitable ducts or openings communicating with the pipes 20 and 21, the former being, preferably, centrally arranged and terminating in a nipple 31 while the latter extends through the barrel to one side of the nipple and enters the space within a nozzle 32. This nozzle 32 is similar in construction and operation to the nozzle shown, described and claimed in Patent No. 1,330,448, dated February 10, 1920, and therefore it need not be further described here, except to say, that in my present construction I have found that by using the nipple 31 for air instead of material to be sprayed I get very good results and avoid a solid stream of material issuing from the atomizer, which, being located at times beyond the range of vision of the operator, may not be observed and the operator could not, therefore, control his air supply accordingly. However, the material to be sprayed may be supplied to the atomizer through either the pipes 20 and 21 and good results obtained. The tubes 20 and 21 emerge through suitable openings on opposite sides of the extension pipe 18 near the top thereof and are of sufficient length and flexibility to permit of the rotatable and angular adjustment of the atomizer barrel.

In operation the material to be supplied to the atomizer in this form of construction is preferably under pressure and as the air for atomizing the material is likewise under pressure, it is desirable to provide some means for regulating the supply of material and air to the atomizer, and particularly is this true in view of the common control of this supply and the medium of the single valve 9 heretofore described. In order to secure this independent regulation, I provide transversely disposed tapped openings in the casting 7 which intersect the ducts 7ª and 7ᵇ and in these openings arrange threaded valves 33 and 34 having knurled heads by which they may be manipulated. By screwing in these valves the supply of material and of compressed air to the atomizer may be independently regulated according to the respective pressures of each.

It will be readily understood that minor changes in the size, form and construction of the various parts of my improved atomizer may be made and substituted for those herein shown and described, without departing from the spirit of my invention, the scope of which is set forth in the appended claims.

What I claim is:

1. An atomizer comprising an extension pipe having a valve at one end in control of the supply of material and compressed air to the atomizer, an atomizer barrel arranged at the opposite end of said pipe or extension, and means for frictionally locking said atomizer barrel in rotatably adjusted positions on said extension.

2. An atomizer comprising an extension pipe having a valve at one end in control of the supply of material and compressed air to the atomizer, an atomizer barrel arranged at the opposite end of said pipe or extension, means for frictionally locking said atomizer barrel in rotatably adjusted positions on said extension, and means for frictionally locking said atomizer barrel in angular adjusted positions on said extension.

3. An atomizer comprising a casting provided with an extension, an atomizer barrel on said extension, valve controlled ports in said casting, connecting means between said ports and barrel, and means for angularly moving the barrel.

4. An atomizer comprising a casting and a revoluble atomizer barrel connected thereto, valve controlled ports in the casting, and suitable connecting means between said ports and barrel.

5. An atomizer comprising an extension tube or pipe, flexible tubes or pipes housed therein for supplying material and compressed air to the atomizer barrel, and an atomizer barrel adjustably mounted on said extension tube or pipe.

6. An atomizer comprising an extension pipe having openings in its opposite sides, flexible tubes housed within said extension pipe and emerging therefrom through said openings, an atomizer barrel rotatably and angularly adjustable on said extension pipe and to which barrel said flexible tubes are connected.

7. In an atomizer, the combination of an extension pipe, a trunnion rotatably mounted in the upper end thereof, means for frictionally locking said trunnion in adjusted positions, a frictional plate carried by said trunnion, a companion frictional plate cooperating with the first mentioned frictional plate and capable of angular adjustment relative thereto, an atomizer barrel carried by said last mentioned friction plate, and means for supplying said atomizer barrel in its different adjusted positions with material to be sprayed and compressed air for spraying said material.

In testimony whereof I hereunto affix my signature this 17th day of February, 1919.

GEO. McD. JOHNS.